United States Patent
Wackerly et al.

(10) Patent No.: US 11,336,527 B2
(45) Date of Patent: May 17, 2022

(54) METHOD AND SYSTEM FOR ENHANCED COMMAND MANAGEMENT IN A NETWORK

(71) Applicant: Hewlett Packard Enterprise Development LP, Houston, TX (US)

(72) Inventors: Shaun Wackerly, London, KY (US);
Shaun Wakumoto, Roseville, CA (US);
Sagar Bhanagay, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 4 days.

(21) Appl. No.: 16/889,648

(22) Filed: Jun. 1, 2020

(65) Prior Publication Data
US 2021/0377121 A1 Dec. 2, 2021

(51) Int. Cl.
*H04L 12/24* (2006.01)
*H04L 41/0893* (2022.01)
*H04L 41/28* (2022.01)
*H04L 41/22* (2022.01)

(52) U.S. Cl.
CPC .......... *H04L 41/0893* (2013.01); *H04L 41/22* (2013.01); *H04L 41/28* (2013.01)

(58) Field of Classification Search
CPC ..... H04L 41/0893; H04L 41/22; H04L 41/28; G06F 17/274
See application file for complete search history.

(56) References Cited

U.S. PATENT DOCUMENTS

2020/0175103 A1* 6/2020 Atwal ..................... H04L 12/00

* cited by examiner

*Primary Examiner* — Glenford J Madamba
(74) *Attorney, Agent, or Firm* — Park, Vaughan, Fleming & Dowler LLP

(57) ABSTRACT

An expression evaluation system is provided. During operation, the system can obtain an encoded expression associated with a user group of a network and evaluate the encoded expression for a first switch to determine a first set of commands that the user group is allowed to execute on the first switch. The encoded expression can encode a set of commands. The system can then determine validity of the first set of commands for the user group by determining whether a respective user of the user group should be allowed to execute the first set of commands on the first switch. If the system identifies an issue with the validity of the first set commands, the system can generate a notification indicating the issue.

16 Claims, 12 Drawing Sheets

METHOD AND SYSTEM FOR ENHANCED COMMAND MANAGEMENT IN A NETWORK

BACKGROUND

Field

The present disclosure relates to communication networks. More specifically, the present disclosure relates to a method and system for facilitating enhanced command management for the switches in a network.

BRIEF DESCRIPTION OF THE FIGURES

In the figures, like reference numerals refer to the same figure elements.

DETAILED DESCRIPTION

Figure 1:
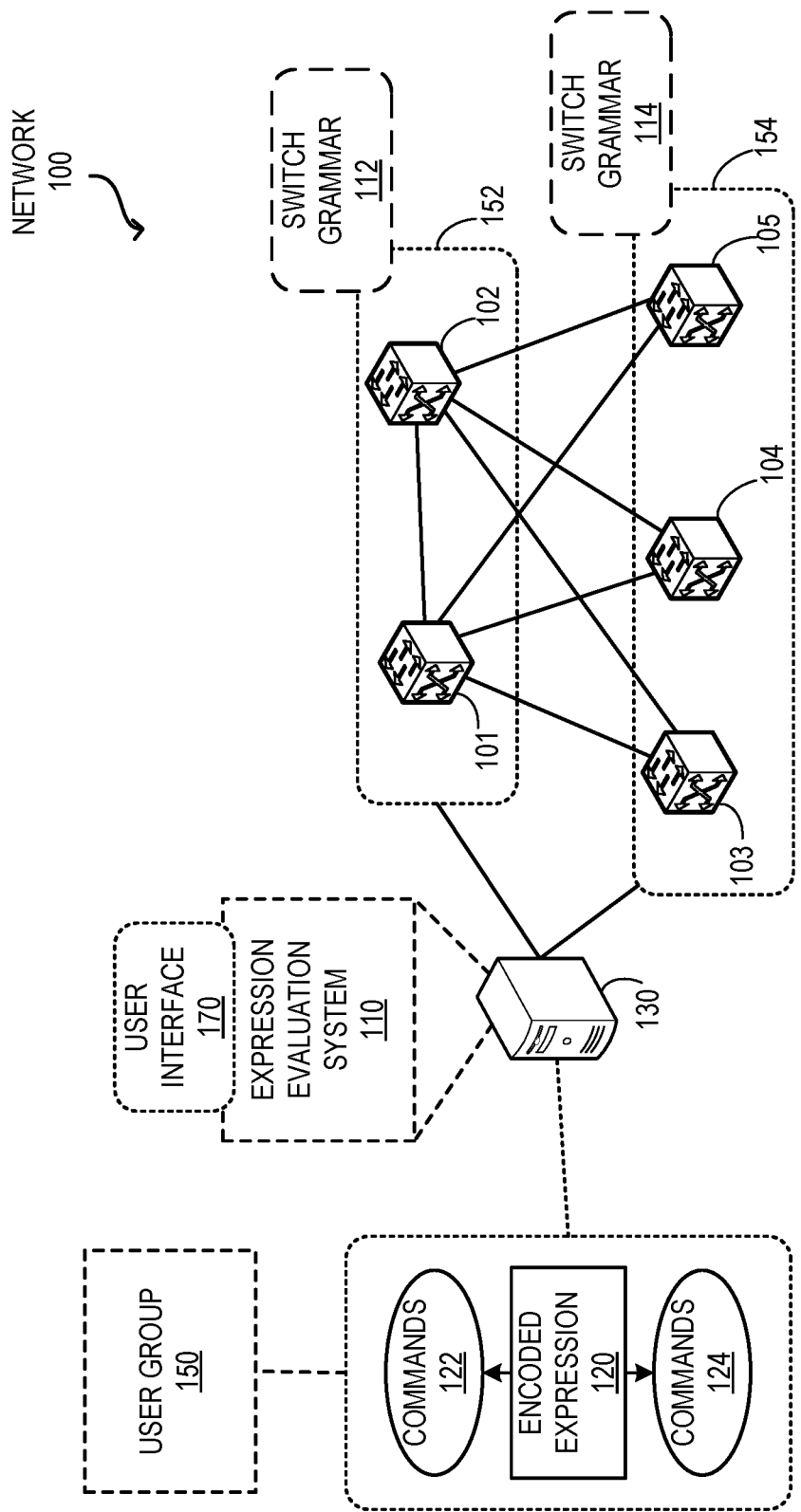
FIG. 1 illustrates an exemplary expression evaluation system that facilitates enhanced command management for the switches in a network, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for bandwidth. As a result, equipment vendors race to build larger switches with significant number of functionalities. However, the processing capability of a switch may not be sufficient to keep up with complex systems that run on such switches. For example, a set of commands may be configured for a respective user of a user group allocated for one or more switches in a network. However, each class of switch may have different capabilities and configurations. As a result, an administrator may individually need to configure the set of commands for each user group for each class of switch.

In particular, a switch may facilitate role-based access control (RBAC) that can define the level of access for each command for the users of a particular user group. For example, an administrator of a network may define one or more user groups based on the requirement of the network. Each user group can be associated with a set of commands. A respective user of the user group is permitted to execute or denied from executing the set of commands on a switch in the network. In other words, if a command finds a match in the set of commands, all users in that user group are either permitted to use or denied from using the command. Typically, the default action is to deny access to any commands that don't match a command in the set of commands.

One embodiment of the present invention provides an expression evaluation system. During operation, the system can obtain an encoded expression associated with a user group of a network and evaluate the encoded expression for a first switch to determine a first set of commands that the user group is allowed to execute on the first switch. The encoded expression can encode a set of commands. The system can then determine validity of the first set of commands for the user group by determining whether a respective user of the user group should be allowed to execute the first set of commands on the first switch. If the system identifies an issue with the validity of the first set commands, the system can generate a notification indicating the issue.

In a variation on this embodiment, the system can evaluate the encoded expression for a second switch in the network to determine a second set of commands that the user group is allowed to execute on the second switch. The system can then compare the first and second sets of commands to determine the presence of inconsistency.

In a variation on this embodiment, the system can obtain a second set of commands previously issued from the user group on the first switch and compare the first and second sets of commands to determine the presence of inconsistency.

In a further variation, the inconsistency indicates one or more of: (i) whether a previously issued command from the user group is absent in the first set of commands, and (ii) whether a command that has not been issued from the user group is included in the first set of commands.

In a variation on this embodiment, the system can evaluate the encoded expression by obtaining switch grammar associated with the first switch and determining the first set of commands by identifying commands that correspond to the encoded expression in the switch grammar. The switch grammar can include a structured representation of commands supported by the first switch.

In a variation on this embodiment, the system can present a user interface depicting a set of commands supported by the first switch and receive a selection that selects the first set of commands from the set of commands.

In a further variation, the set of commands can be categorized into a set of command groups. The system can then generate a sub-expression for a respective command group that has been selected and combine one or more generated sub-expressions to generate the encoded expression.

In a variation on this embodiment, the system can determine the validity of the first set of commands by presenting the first set of commands to a user in a user interface and obtaining user feedback regarding the validity of the encoded expression.

In a variation on this embodiment, the system can determine, for the first set of commands, an outlier in the user group based on commands issued by a respective user of the user group.

In a variation on this embodiment, the system can determine whether the first set of commands conforms to a policy indicating whether the user group can be allowed to execute the first set of commands on the first switch.

The embodiments described herein solve the problem of validating an encoded expression, which can encode a set of commands executable on a switch, by (i) evaluating the encoded expression, which retrieves the set of commands from the encoded expression, for different switch types in a network, and (ii) determining validity for the encoded expression for a respective switch type. In this way, each user group of the network can be configured with a set of commands that is consistent among the switches of the network and may conform to historical data, which can be the commands that have been previously issued by the users of the user group.

With existing technologies, an administrator may configure a set of commands that the users of a user group of a network is permitted to execute. A respective user group can include one or more users that share the same set of permissions. The administrator can use role-based access control (RBAC) to configure the set of commands. RBAC facilitates command-level control over users that dictates which specific commands a user has permissions to use. Since the number of commands in the set may be large, RBAC allows the administrator to use a form of encoding (e.g., regular expressions) to concisely identify the set of commands, thereby generating an encoded expression. However, the encoded expression can be difficult to validate for consistency with other switches, historical data, and modifications.

To solve this problem, an enhanced command management (ECM) system can evaluate a respective encoded expression for each type of switches in the network. To facilitate the evaluation operation, the system can maintain a structured representation of the commands and configurations supported by a respective switch. In some embodiments, the structured representation can be based on the switch grammar that defines the structure of the commands and configurations of a switch. For example, the commands can be represented in a grammar tree. A base or root command (e.g., "show") can be a high-level node of the tree, and the variants of the command (e.g., "show X") can be the child nodes of the node in the tree. Different switch types in the network can have different switch grammar. A switch type can correspond to a switch class or series of a switch vendor or a deployment layer (e.g., a core or an edge switch). For example, the switch grammar of a core switch may not include commands for interacting with client devices.

The system can provide a user interface that allows an administrator to define an encoded expression for a user group of the network. Examples of the user interface can include, but are not limited to, a command-line interface (CLI), a graphical user interface (GUI), a web interface, a touch interface, a motion interface, and a virtual or augmented reality interface. The system can then evaluate (or decode) the encoded expression based on the structured representation associated with the switch. The evaluation can include determining a set of commands that corresponds to the encoded expression. For example, if the encoded expression includes a regular expression "show *," the corresponding set of commands can include a respective variant of command "show." The set of commands can be represented by a data structure, such as a tree.

Upon evaluating the encoded expression based on the structured representation associated with the switch, the system can validate the encoded expression for consistency. For example, if the network includes another type of switch (e.g., different classes or different hierarchies), the system can also evaluate the encoded expression for the other type of switch based on the associated structured representation. The system can then compare the two sets of commands to ensure that the same permissions are configured for the user group in each type of switches. A respective permission can define what the users in the user group can and cannot do on a switch. Even though different types of switches may support different commands, having the same permissions can ensure that the outcomes of the commands are the same. Similarly, if an administrator issues a new encoded expression for the user group, the system can evaluate the encoded expression to determine whether the underlying encoded commands are consistent with the previous commands issued from that user group.

The system can also monitor the commands issued by the users belonging to the user group. The system can compare the issued commands with the underlying commands of an encoded expression to identify outliers in the user group. An outlier in a user group can be a user whose issued commands are significantly different than the commands issued by rest of the users of the user group. In some embodiments, the system can obtain a set of policies that indicates which user is allowed to execute which commands. When the administrator issues a new encoded expression for the user group, the system can evaluate the encoded expression to determine whether the underlying commands conform to the policies. Hence, the system can ensure that a respective command allocated to a user group is uniformly used among the users of the user group and allowed to be allocated to all users of the user group. In this way, the system can reduce the complexity of managing the encoded commands without reducing the benefits of encoding.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

Network Architecture

FIG. 1 illustrates an exemplary expression evaluation system that facilitates enhanced command management for the switches in a network, in accordance with an embodiment of the present application. As illustrated in FIG. 1, a network 100 includes switches 101, 102, 103, 104, and 105. In some embodiments, network 100 is a Gen-Z network and a respective switch of network 100, such as switch 102, is a Gen-Z component. A Gen-Z network can be a memory-semantic fabric that can be used to communicate to the devices in a computing environment. By unifying the communication paths and simplifying software through simple memory-semantics, Gen-Z components can facilitate high-performance solutions for complex systems. Under such a scenario, communication among the switches in network 100 is based on memory-semantic fabric. In some further embodiments, network 100 is an Ethernet and/or IP network, and a respective switch of network 100, such as switch 102, is an Ethernet switch and/or IP router. Under such a scenario, communication among the switches in network 100 is based on Ethernet and/or IP.

Network 100 can include different types of switches. Switches 101 and 102 can have a switch type 152, and switches 103, 104, and 105 can have a switch type 154. The types of switches can be based on one or more of: hardware capabilities, switch features, and deployment types. For example, switch type 152 can indicate aggregate switches, and switch type 154 indicates edge switches. Similarly, switch type 152 can indicate one platform (e.g., switch series or class of switches), and switch type 154 can indicate another platform. In other words, a switch type corresponds to one or more of: a switch class and a deployment hierarchy.

With existing technologies, an administrator may configure a set of commands for a user group 150 of network 100. User group 150 can include one or more users that share the same set of permissions. The administrator can use RBAC to define the set of commands. RBAC facilitates command-level control over users in user group 150 for dictating the specific commands the users of user group 150 have permissions to use. Since the number of commands in the set may be large, RBAC allows the administrator to use regular expressions to concisely identify the set of commands, thereby generating an encoded expression 120. However, encoded expression 120 can be difficult to validate for consistency with other switches in network 100, historical data, and modifications.

To solve this problem, network 100 can be managed by an enhanced command management system 110. System 110 can operate on a computing device 130 coupled to network 100. Computing device 130 can be a physical device (e.g., a server) or a virtual device (e.g., a virtual machine). System 110 can evaluate encoded expression 150 for each type of switches in network 100. To facilitate the evaluation operation, system 110 can maintain a structured representation of the commands and configurations supported by a respective switch of network 100. In some embodiments, the structured representation can be based on the switch grammar that defines the structure of the commands and configurations of a switch. Commands supported by switch types 152 and 154 can be defined based on switch grammars 112 and 114, respectively. For example, if switch type 152 indicates core switches, switch grammar 112 may not include commands for interacting with client devices.

System 110 can provide a user interface 170 that allows an administrator to define encoded expression 120 for user group 150 on switch 102. System 110 can then evaluate (or decode) encoded expression 120 based on switch grammar 112 associated with switch 102. The evaluation can include determining a set of commands 122 in switch grammar 112 (e.g., in a grammar tree associated with switch type 152) that corresponds to encoded expression. For example, if encoded expression 120 includes a regular expression "show *," the corresponding set of commands 122 can include a respective variant of command "show." System 110 can represent commands 122 in a data structure, such as a tree.

Upon evaluating encoded expression 120 based on switch grammar 112, system 110 can validate encoded expression 120 for consistency. Since network 100 includes another type of switch (i.e., switch type 154), system 110 can also evaluate encoded expression 150 for switch type 154 based on switch grammar 114 to obtain the corresponding set of commands 124. System 110 can then compare sets of commands 122 and 124 to ensure that the same permissions are configured for user group 150 in the switches belonging to both switch types 152 and 154. A respective permission can define what the users in user group 150 can and cannot do on a switch. Even though switch types 152 and 154 may support different commands, having the same permissions can ensure that the outcomes of the commands are the same. Furthermore, when an administrator issues encoded expression 120 for user group 150, system 110 can evaluate encoded expression 120 to determine whether underlying encoded commands 122 are consistent with the previous commands issued from user group 150 (i.e., the commands that have previously been issued on the switches by the users of user group 150).

System 110 can also monitor the commands issued by the users belonging to user group 150. System 110 can compare the issued commands with commands 122 to identify outliers in user group 150. An outlier in user group 150 can be a user whose issued commands are significantly different than the commands issued by rest of the users of user group 150. In addition, system 110 can obtain a set of policies that indicates which user of user group 150 is allowed to execute which commands. Furthermore, when the administrator issues encoded expression 120 for user group 150, system 110 can evaluate encoded expression 120 to determine whether commands 122 conform to the policies. Hence, system 110 can ensure that a respective command in commands 122, which are allocated to user group 150, is uniformly applied among the users of user group 150. System 110 can also ensure that commands 122 are allowed to be allocated to all users of user group 150. In this way, system 110 can reduce the complexity of managing commands that are encoded (or represented) in encoded expressions (e.g., using regular expressions) without reducing the benefits of the encoding.

Figure 2A:
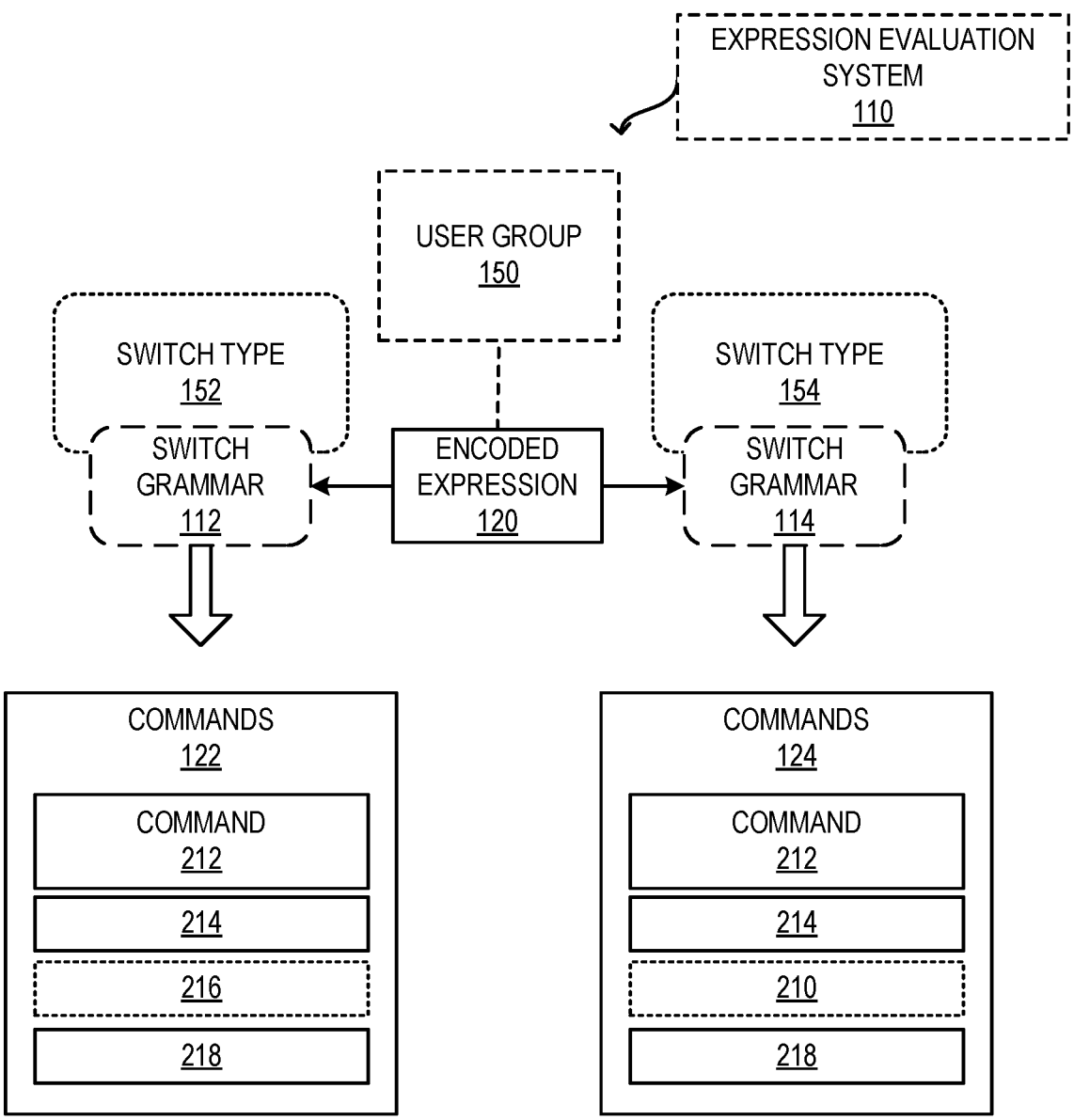
FIG. 2A illustrates an exemplary validation process of an expression evaluation system, in accordance with an embodiment of the present application.

FIG. 2A illustrates an exemplary validation process of an expression evaluation system, in accordance with an embodiment of the present application. When encoded expression 120 is defined, system 110 can compare encoded expression 120 across multiple switch types 152 and 154. This comparison can allow system 110 to determine whether user group 150 is configured identically across all switches. To do so, system 110 can evaluate encoded expression 120 based on the commands defined in switch grammar 112 to determine decoded commands 122 configured for switch type 152. Commands 122 can include commands 212, 214, 216, and 218. System 110 can also evaluate encoded expression 120 based on the commands defined in switch grammar 114 to determine decoded commands 124 configured for switch type 154. Commands 124 can include commands 212, 214, 210, and 218.

Based on the evaluation, system 210 can determine that commands 216 and 210 are different for user group 150 in switch types 152 and 154, respectively. This allows system 110 to correlate specific commands the users in user group 150 would or wouldn't be permitted to use and determine the differences between encodings in terms of functional differences. System 110 can provide an administrator with commands 216 and 210 that have conflicting permissions for user group 150. System 110 can visually highlight that conflict in a user interface (denoted with dotted lines). Similarly, system 110 can compare encoded expressions defined for different user groups by evaluating the encoded expressions across switch types 152 and 154. For example, if two user groups correspond to users that should have the same level of permission, system 110 can evaluate and compare the encoded expressions for the two user groups.

Since commands associated with encoded expression 120 can be encoded in multiple ways, system 110 can evaluate (or decode) encoded expression 120 based on each of the multiple ways, and compare the decoded commands for logical or functional equivalence. For example, command [212-218], command (212|214|216|218), and (command 212|command 214|command 216|command 218) can be functionally equivalent. System 110 can then recommend combining the user groups that are logically or functionally equivalent. This may lead to efficient command management as fewer or less complex encodings cause a fewer number of checking each time a user attempts to use a particular command.

Figure 2B:
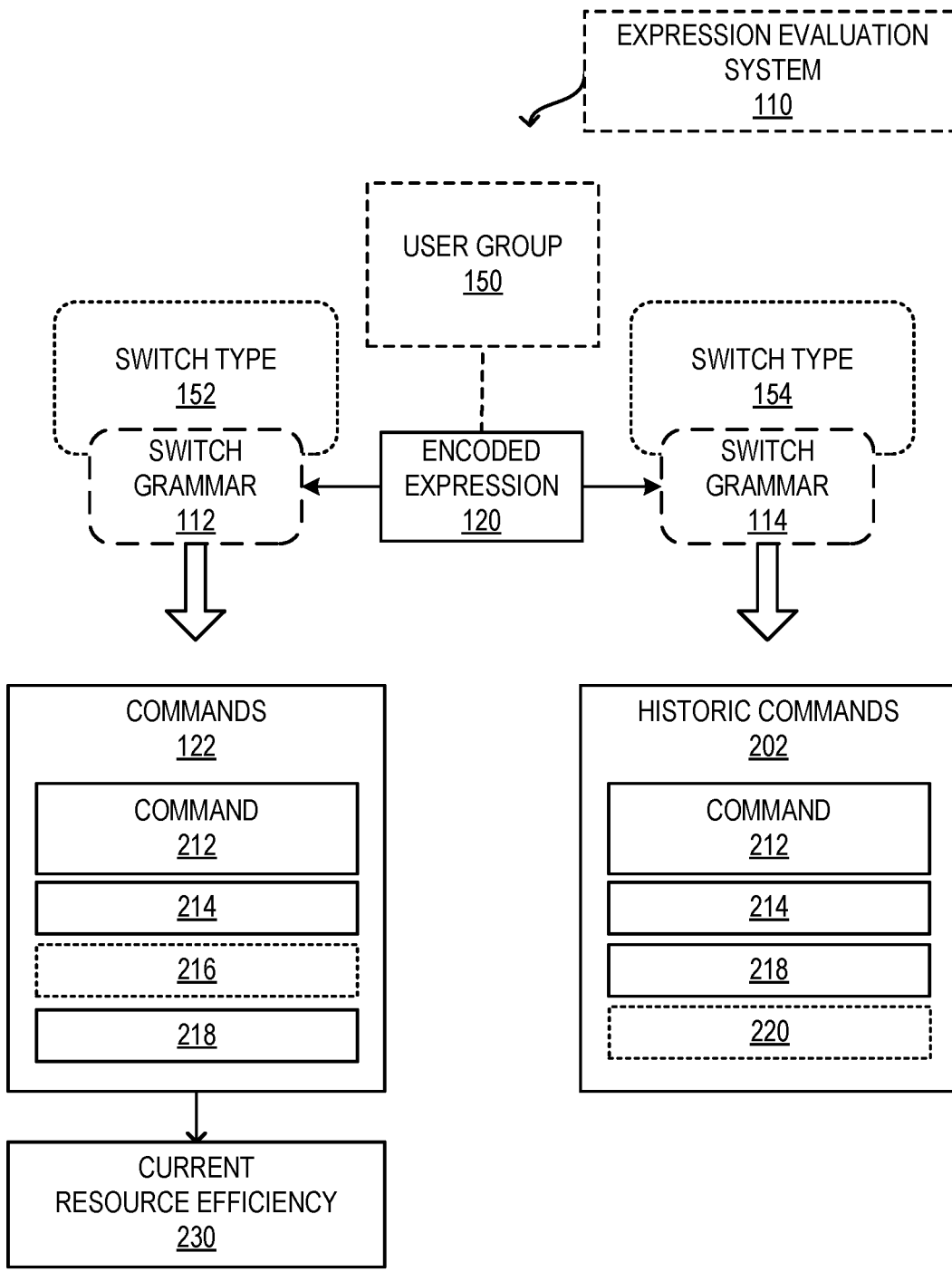
FIG. 2B illustrates an exemplary historical analysis process of an expression evaluation system, in accordance with an embodiment of the present application.

FIG. 2B illustrates an exemplary historical analysis process of an expression evaluation system, in accordance with an embodiment of the present application. System 110 can track commands issued to change configuration, firmware, and topology over time, and record a respective user that may make a change. In some embodiments, system 110 (and a respective switch) may maintain a time-series database that stores the recoded information. When an administrator updates encoded expression 120 for user group 150, system 110 can review historic commands 202 issued from user group 150. System 110 can then determine whether any command in historic commands 202 has been disallowed by updated encoded expression 120 and whether updated encoded expression 120 corresponds to a command that is not in historic commands 202. This may allow an administrator to determine whether the change may impact the past workflows.

For this determination, system 110 can evaluate encoded expression 120 based on the commands defined in switch grammar 112 to determine decoded commands 122 configured for switch type 152. Commands 122 can include commands 212, 214, 216, and 218. On the other hand, historic commands 202 can include commands 212, 214, 218, and 220. By comparing commands 122 and historic commands 202, system 110 can determine that command 220 in historic commands 202 has been disallowed by updated encoded expression 120. System 110 can also determine that updated encoded expression 120 represents command 216 that has not been issued from user group 150 (i.e., not in historic commands 202). System 110 can provide an administrator with commands 216 and 220. The system can then notify the administrator indicating a potential misconfiguration because command 216 has been allowed even though it has not previously been allowed and command 220 has been disallowed even though it has previously been allowed. System 110 can visually highlight that conflict in a user interface (denoted with dotted lines).

As described above, the encoding mechanism of encoded expression 120 (e.g., a regular expression) may have multiple ways to encode. Some encoding can be less efficient and more memory-intensive than another encoding. By monitoring a current resource efficiency 230 of commands 122 (e.g., memory and processing resource utilization of commands 122) on the switches (e.g., the switches of network 100 of FIG. 1) over time, system 110 can determine whether updated encoded expression 120 is an inefficient encoding. System 110 can then generate a warning and provide the warning to the administrator. System 110 may also propose possible optimizations for encoded expression 120. In some embodiments, system 110 can use the information in the time-series database to identify when inefficient encodings are introduced.

Figure 2C:
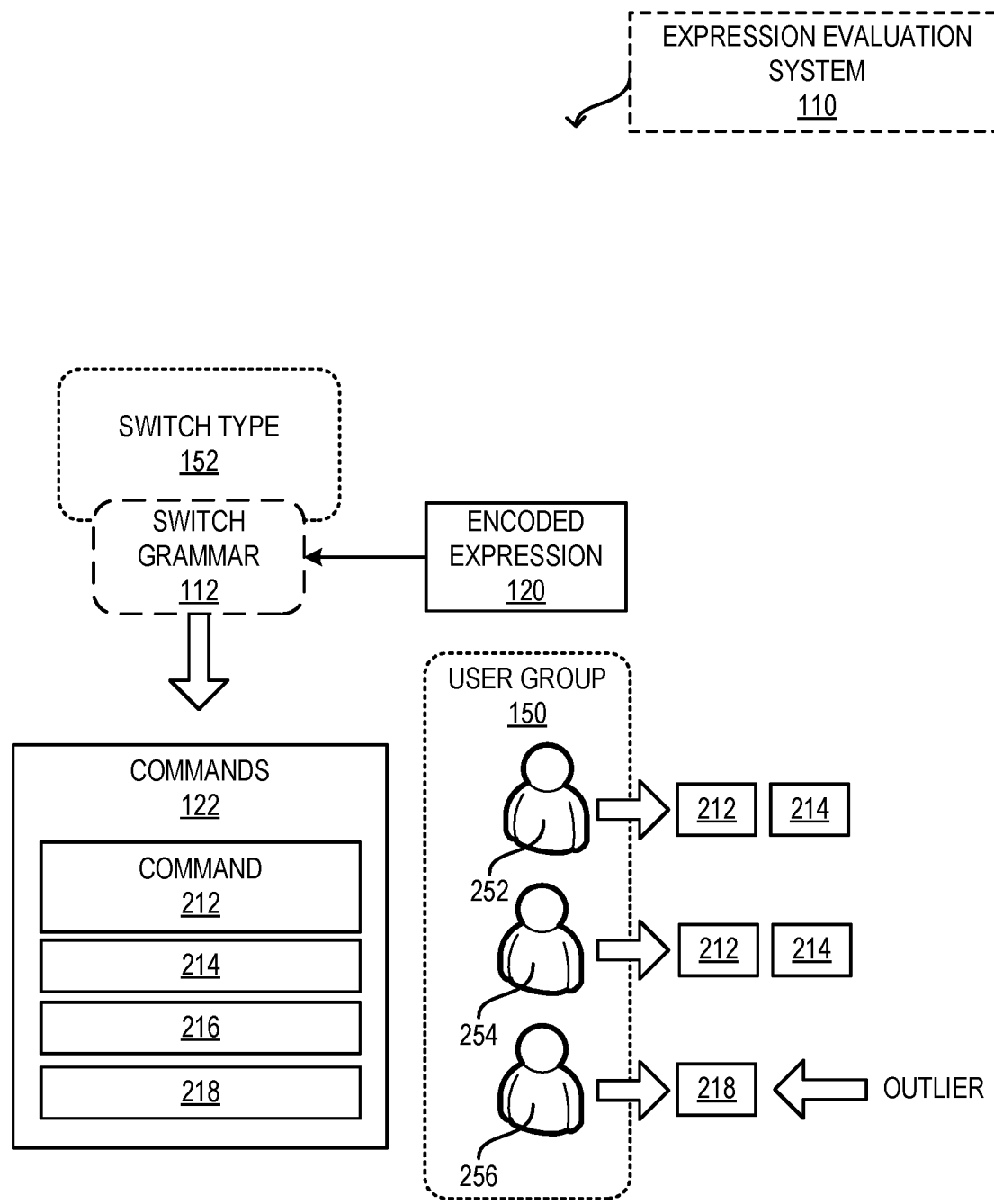
FIG. 2C illustrates an exemplary outlier detection process of an expression evaluation system, in accordance with an embodiment of the present application.

FIG. 2C illustrates an exemplary outlier detection process of an expression evaluation system, in accordance with an embodiment of the present application. Within the permitted commands, system 110 can maintain a record of which user has issued which command (e.g., as time-series information). If user group 150 includes users 252, 254, and 256, system 110 can determine which user has used which command from commands 122. If users 252 and 254 uses commands 212 and 214 while user 256 uses command 218, system 110 can detect user 256 as an outlier. To identify an outlier, system 110 can utilize any outlier detection mechanism.

For example, for each user, system 110 can determine the number of commands that overlap with commands issued by at least n number users. If the number of overlapping commands for a user is below a threshold, system 110 can identify the user as an outlier. In this way, even if user 256 has used a command 218, which is permitted in encoded expression 120, system 110 can identify user 256 as an outlier. This allows an administrator to monitor whether a user has been engaged in malicious activity using permitted commands.

Figure 2D:
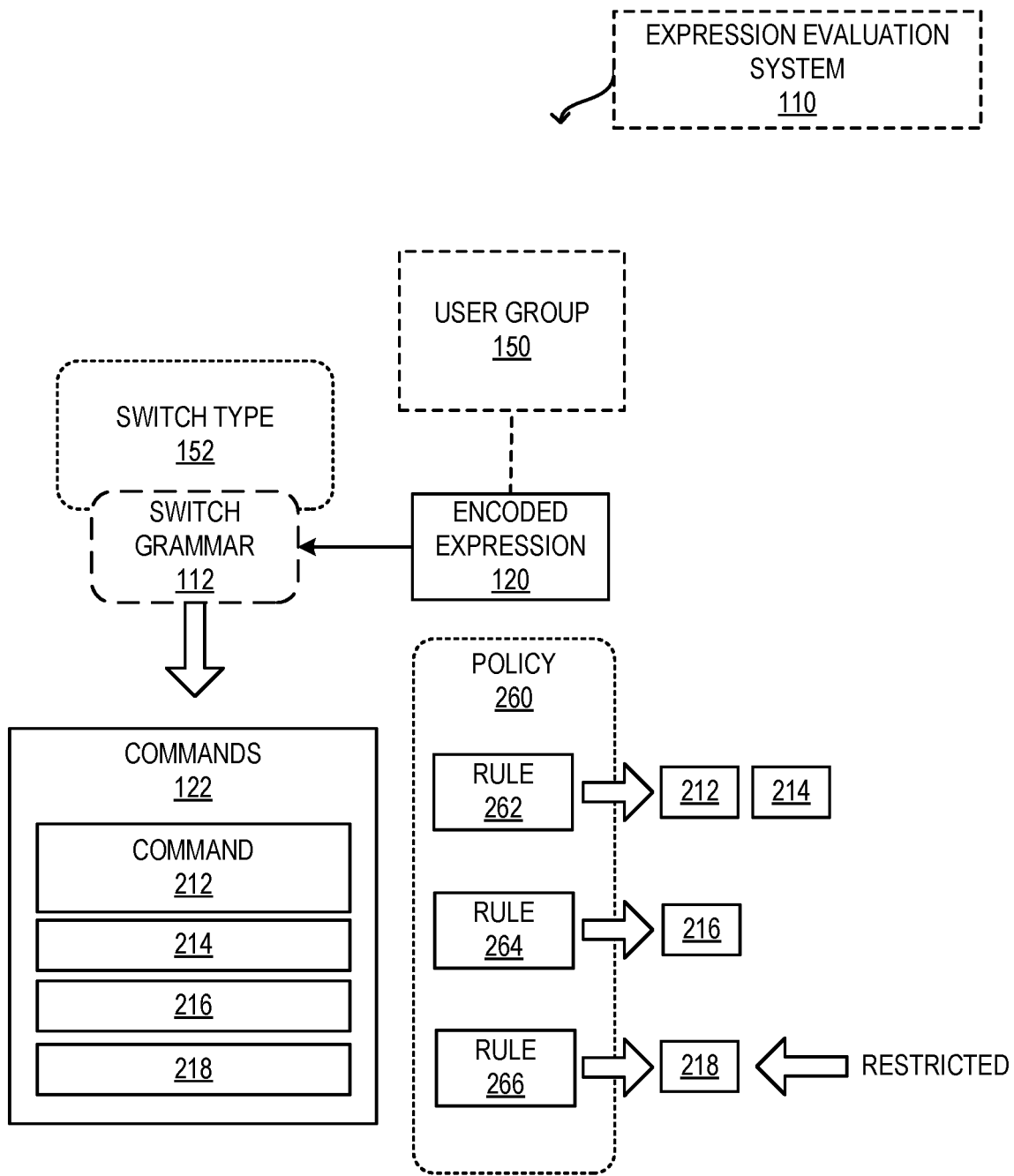
FIG. 2D illustrates an exemplary policy validation process of an expression evaluation system, in accordance with an embodiment of the present application.

FIG. 2D illustrates an exemplary policy validation process of an expression evaluation system, in accordance with an embodiment of the present application. A network can be maintained by a hierarchy of administrators where different administrators may have different levels of administrative access to the permission on the commands. Senior administrators may wish to set up additional forms of validation, such as conformance (e.g., a validation that can occur before the configuration change is committed to a switch) or change validation (e.g., a validation that can occur after the configuration change is committed to a switch), based on one or more policies directed to the user groups. A policy 260 can be set up for user group 150. Policy 260 can include one or more rules. Each rule can include a conformance condition. System 110 can determine whether a command executed by a user violates any conformance condition. System 110 can provide validation of the encoded expressions to prevent manual oversight from introducing errors into the network configuration.

For example, after deploying a change to encoded expression 120, system 110 may check whether encoded expression 120 conforms to policy 260. Upon detecting an unconformity, system 110 can issue an 'error' status for encoded expression 120 and alert the administrators. Policy 260 can include a rule 262 that allows the execution of commands 212 and 214, and a rule 264 that allows the execution of command 216. For example, rule 264 can indicate "only users in group 150 can execute command 216." This allows an administrator to incorporate command 216 while defining encoded expression 120 for user group 150.

On the other hand, policy 260 can also include a rule 266 that restricts the execution of command 218. For example, rule 266 can indicate "only senior administrators can enable/disable command 218." If an administrator does not have sufficient access to enable/disable command 218, that administrator may not be able to incorporate command 218 into encoded expression 120. As a result, even if the administrator defines encoded expression 120 for user group 150, system 110 may not propagate encoded expression 120 to the switches of switch type 152 and notify a senior administrator for approval (e.g., send a text message or email to the senior administrator).

Figure 3A:
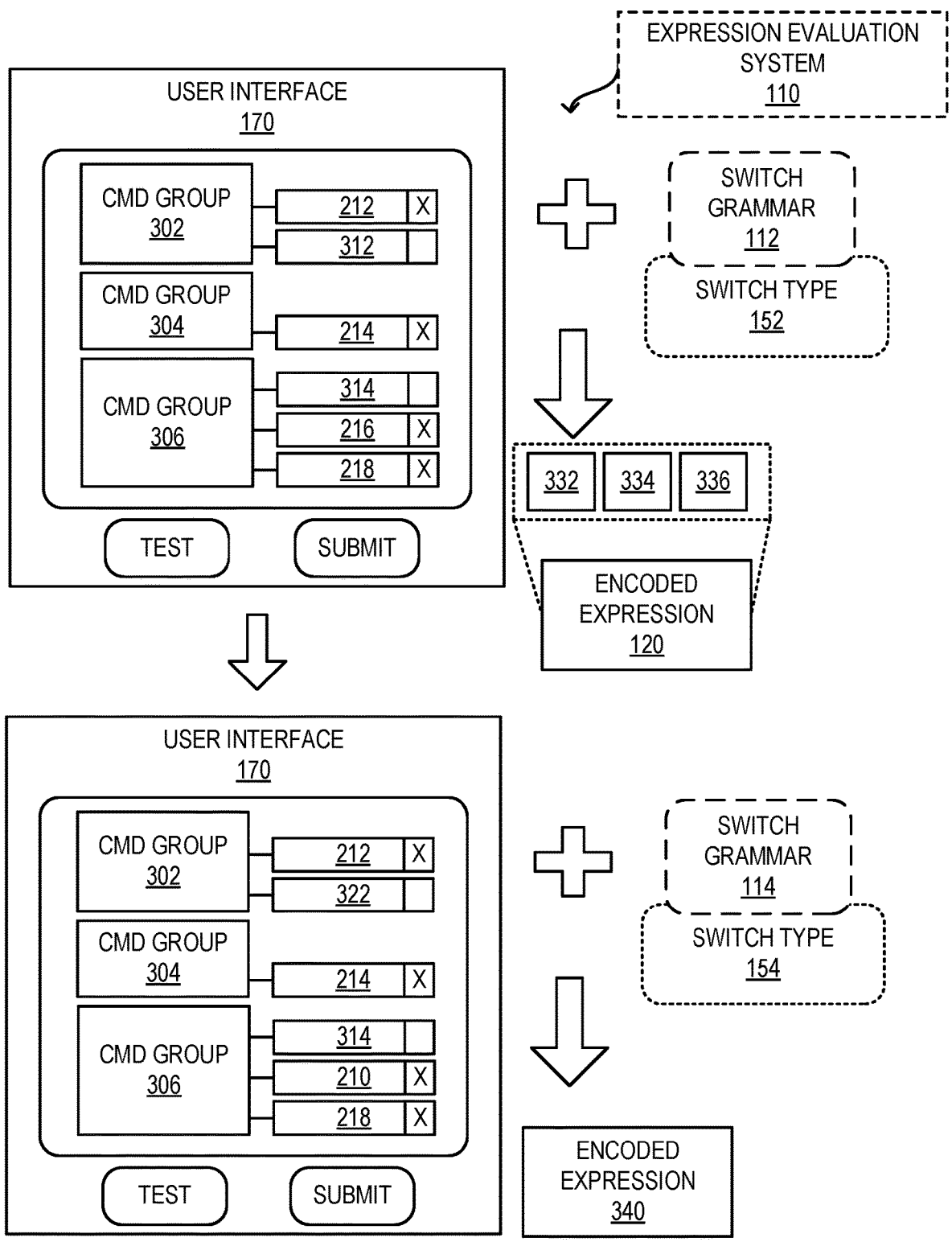
FIG. 3A illustrates an exemplary user interface of an expression evaluation system generating an encoded expression, in accordance with an embodiment of the present application.

FIG. 3A illustrates an exemplary user interface of an expression evaluation system generating an encoded expression, in accordance with an embodiment of the present application. System 110 can also be used to generate encoded expression 120 for switch type 152. In some embodiments, system 110 may provide a user with a selectable list of commands in user interface 170 that are available in switch grammar 112. System 110 can group the list of commands into command groups 302, 304, and 306. Each command group can correspond to a base or root command (e.g., "show"). Upon receiving a selection of a command group, user interface 170 can present individual commands, which can be the variants of the root command (e.g., "show X"), in association with the selected command group. Reselecting the command group may hide the commands in user interface 170.

In this example, command group 302 can include commands 212 and 312, command group 304 can include command 214, and command group 306 can include commands 314, 216, and 218. User interface 170 can present a respective command with a selection option. The user can select one or more commands from the list of commands. In this example, the user can select commands 212, 214, 216, and 218, and submit the selection. System 110 can then dynamically construct sub-expressions 332, 334, and 336 that encode commands in command groups 302, 304, and 306, respectively based on switch grammar 112.

System 110 can then combine sub-expressions 332, 334, and 336 to generate encoded expression 120. Each of sub-expressions 332, 334, and 336 can be a regular expression. In this way, encoded expression 120 can incorporate selected commands 212, 214, 216, and 218, and exclude commands 312 and 314, which have not been selected. In some embodiments, system 110 can apply an iterative process that may apply a series of heuristics to commands 212, 214, 216, and 218 to reduce encoded expression 120 to a desired expression (e.g., a compact regular expression). The heuristics may reduce to a common prefix or summarize variances.

Upon generating encoded expression 120, if the user instructs system 110 to generate an encoded expression for switch type 154, system 110 may determine a difference between switch grammars 112 and 114. System 110 can identify commands 322 and 210 that are different in switch grammar 114. System 110 can use a machine learning technique to determine "similar" commands. When constructing an encoded expression for switch type 154, system 110 may determine one or more actions for commands 322 and 210. The actions can indicate whether commands 322 and 210 should be included or excluded, handled based on similarity to commands associated with encoded expression 120.

For example, if commands 322 and 210 execute similar operations as commands 312 and 216, respectively, system 110 may generate encoded expression 340 based on the previous selection choices of the user for switch type 152. Encoded expression 340 can then include command 210 and exclude command 322. It should be noted that encoded expression 340 can be a variant of encoded expression 120 for switch type 154. System 110 can also present the commands in user interface 170 to allow the users to select the commands. User interface 170 can adjust the display for generating an encoded expression for switch type 154 by presenting a selectable list of commands in user interface 170 that are available in switch grammar 114. User interface 170 can present different commands 322 and 210 in association with command groups 302 and 306, respectively. The user can then select the commands for generating encoded expression 340.

In some embodiments, system 110 can combine the historical data, as described in conjunction with FIG. 2B, with the generation of encoded expression. System 110 can analyze the command history for a respective user group to identify the commands a respective user has used. System 110 can then use the list of historic commands to generate an encoded expression that may allow previously-used commands. Furthermore, when an administrator generates an encoded expression, user interface 170 can be equipped with a "test" button. When the administrator presses the test button, user interface 170 can display the set of commands which are allowed and blocked by the proposed encoded expression. This allows the administrator to verify that the encoded expression is doing what the encoded expression is expected to do before deploying the encoded expression to the switches.

Figure 3B:
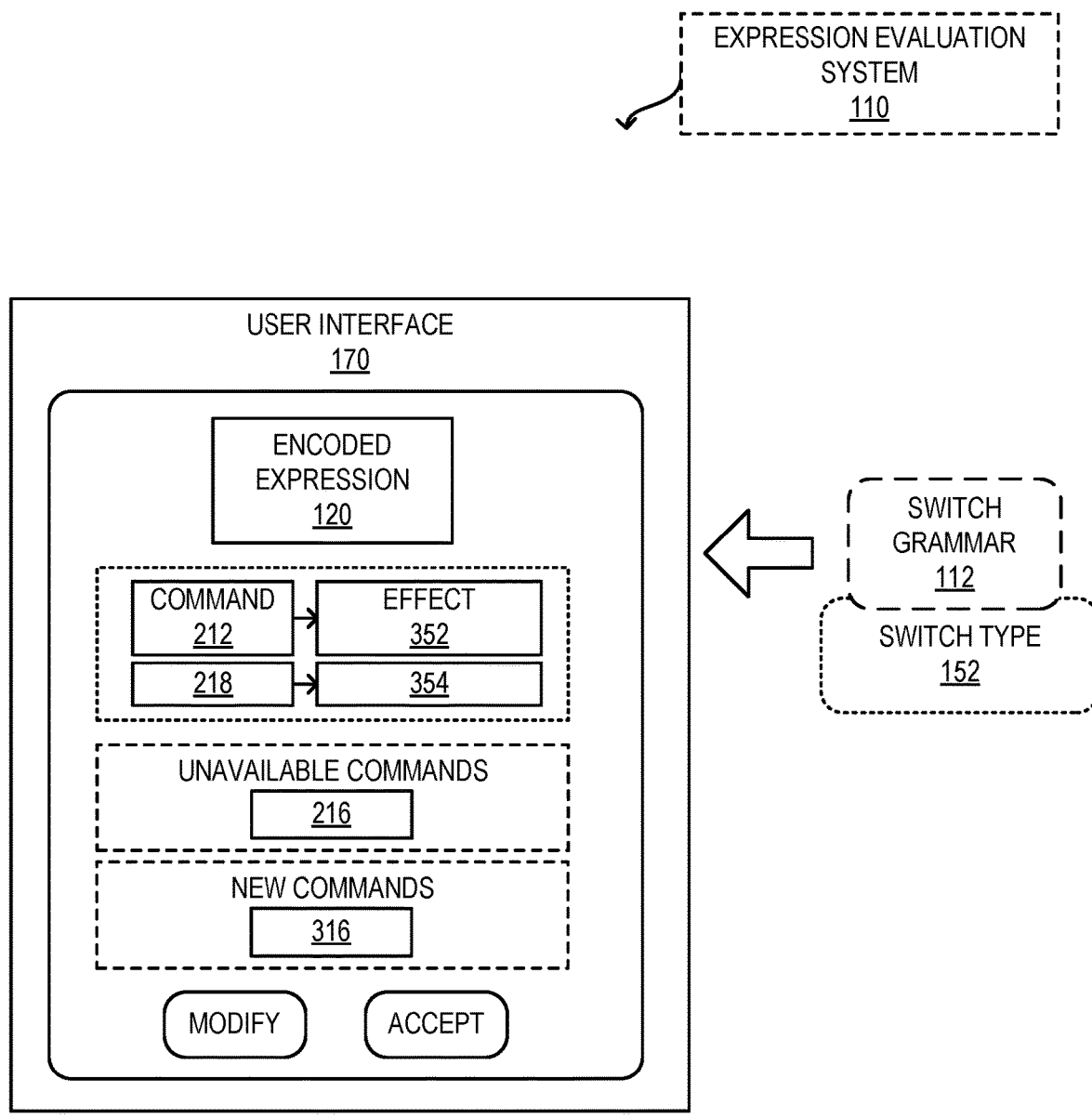
FIG. 3B illustrates an exemplary user interface of an expression evaluation system presenting an encoded expression for verification, in accordance with an embodiment of the present application.

FIG. 3B illustrates an exemplary user interface of an expression evaluation system presenting an encoded expression for verification, in accordance with an embodiment of the present application. If a firmware is updated for switch type 152, system 110 can determine the differences in the commands facilitated by the two firmware versions associated with switch grammar 112. System 110 can then present a report in user interface 170. The report can include the commands that may become unavailable for the current encoding. The report can also include the new commands that may become available for the new firmware version. For example, user interface 170 can show a report for a firmware change associated with encoded expression 120. The report can show that command 216 has become unavailable for encoded expression 120. The report can also show that a new command 316 has become available that can be encoded.

Furthermore, if system 110 obtains a configuration change, system 110 may identify any changes in encoded expression 120 since the configuration change may affect permissions on the commands. System 110 can generate a report for the configuration change. The report may show the commands, which are associated with encoded expression 120, that may be affected due to the configuration change.

Such an effect can include changes to the access levels and the users affected by the change. For example, user interface 170 may show that, due to a configuration change, commands 212 and 218 are impacted by effects 352 and 354, respectively.

It should be noted that, even though FIG. 3B depicts modifications, unavailable commands, and new commands in user interface 170, these display elements may not appear together in user interface 170. For example, user interface 170 may show the modifications if a configuration affecting encoded expression 120 is changed. On the other hand, if a firmware affecting encoded expression 120 is updated, user interface 170 may show the new and unavailable commands.

Operations

Figure 4A:
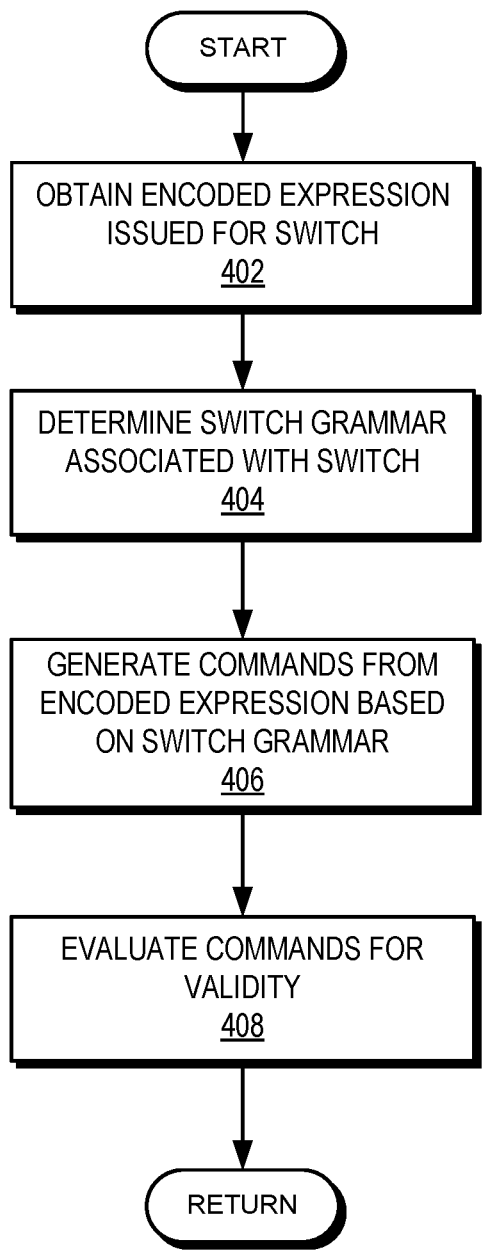
FIG. 4A presents a flowchart illustrating the process of an expression evaluation system evaluating an encoded expression, in accordance with an embodiment of the present application.

FIG. 4A presents a flowchart illustrating the process of an expression evaluation system evaluating an encoded expression, in accordance with an embodiment of the present application. During operation, the system can obtain an encoded expression issued for the switch (operation 402) and determine the switch grammar associated with the switch (operation 404). The system can then generate the commands from the encoded expression based on the switch grammar (operation 406). Subsequently, the system can evaluate the commands for validity (operation 408).

Figure 4B:
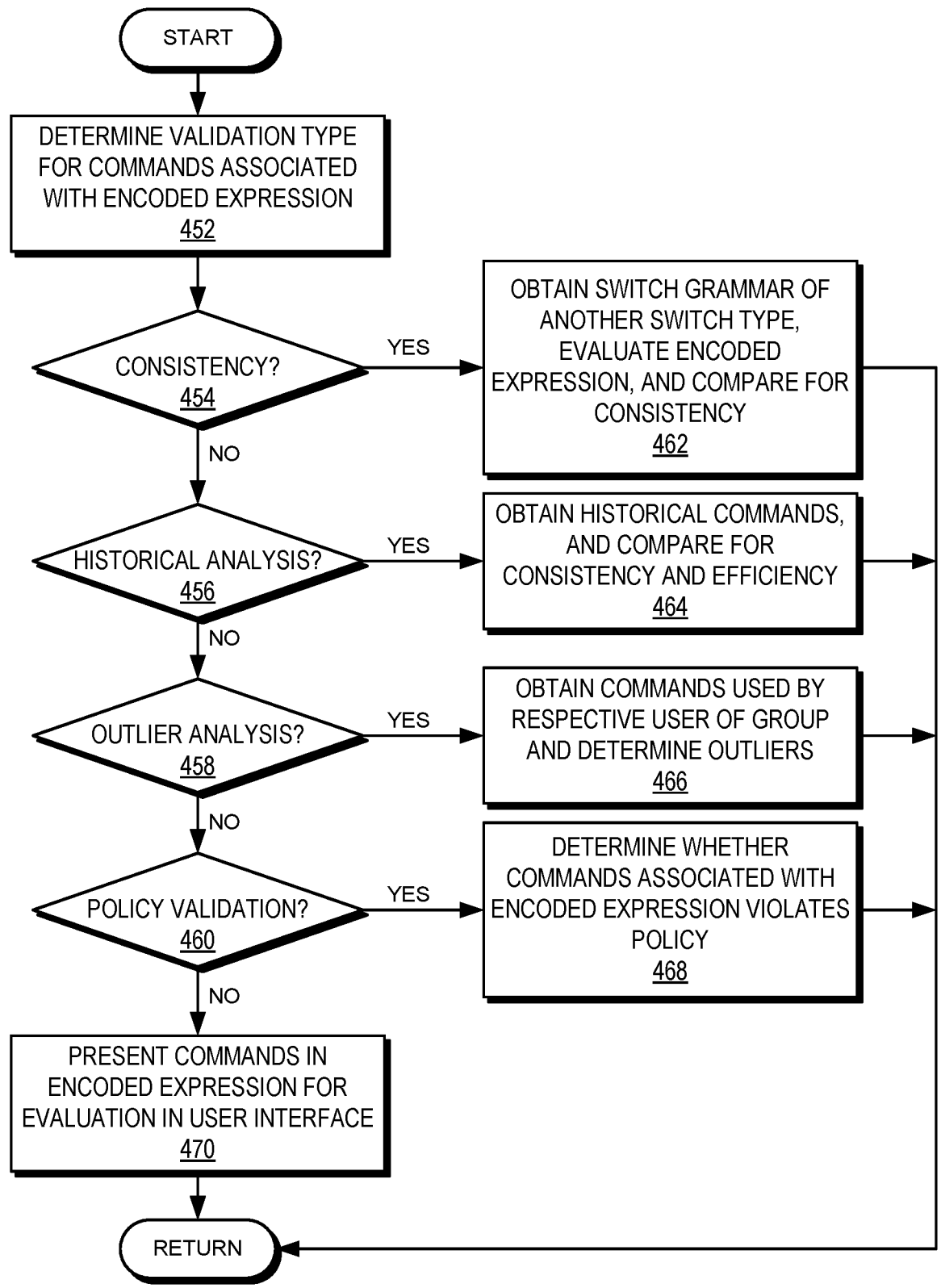
FIG. 4B presents a flowchart illustrating the process of an expression evaluation system validating an encoded expression, in accordance with an embodiment of the present application.

FIG. 4B presents a flowchart illustrating the process of an expression evaluation system validating an encoded expression, in accordance with an embodiment of the present application. During operation, the system can determine a validation type for commands associated with the encoded expression (operation 452). If the validation type is consistency (operation 454), the system can obtain the switch grammar of another switch type, evaluate the encoded expression, and compare the commands for both switch types for consistency (operation 462). Otherwise, if the validation type is historical analysis (operation 456), the system can obtain the historical commands, and compare the commands and the historical commands for consistency and efficiency (operation 464).

If the validation type is not consistency or historical analysis, the validation type can be outlier analysis (operation 458). The system can then obtain commands used by a respective user of the user group and determine outliers (operation 466). Otherwise, if the validation type is policy validation (operation 460), the system can determine whether the commands associated with the encoded expression violates any policy (operation 468). If the validation type is not consistency, historical analysis, outlier analysis, or policy validation, the system can present the commands associated with the encoded expression for evaluation in the user interface (operation 470).

Figure 5:
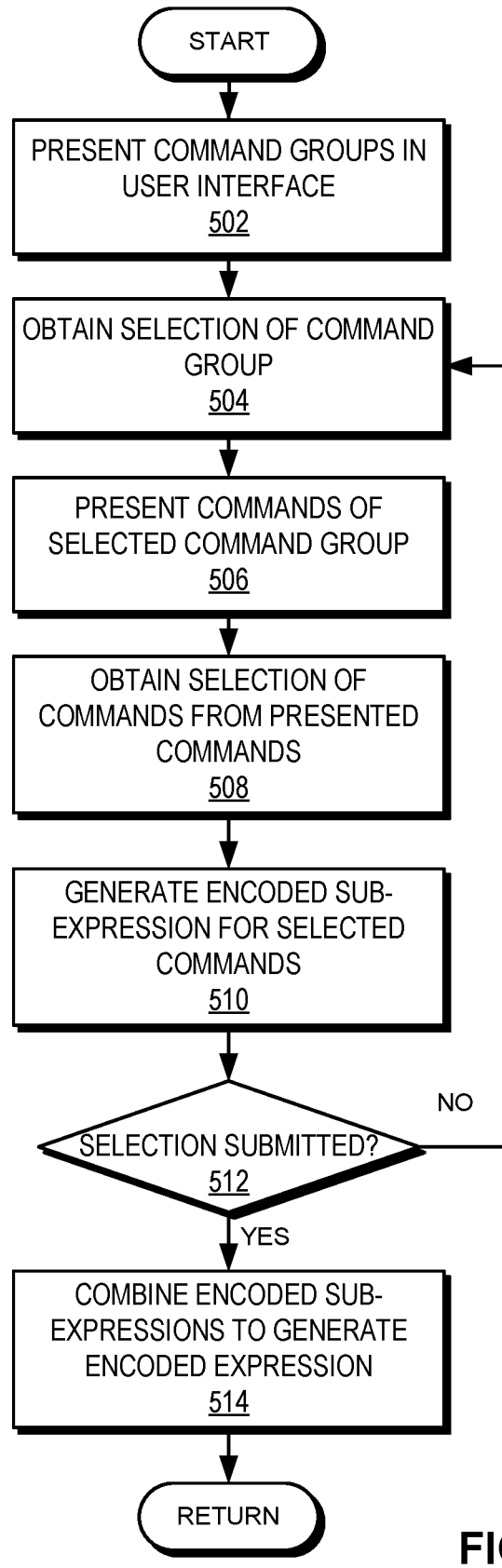
FIG. 5 presents a flowchart illustrating the process of an expression evaluation system generating an encoded expression using a user interface, in accordance with an embodiment of the present application.

FIG. 5 presents a flowchart illustrating the process of an expression evaluation system generating an encoded expression using a user interface, in accordance with an embodiment of the present application. During operation, the system can command groups in the user interface (operation 502) and obtain a selection of a command group (operation 504). The system can then present the commands of the selected command group (operation 506) and obtain a selection of commands from the presented commands (operation 508).

The system can generate an encoded sub-expression for the selected commands (operation 510). The system can then check whether the selection has been submitted (operation 512). If not submitted, the system can continue to obtain a selection of a command group (operation 504). If the selection has been submitted, the system can combine the encoded sub-expressions to generate an encoded expression (operation 514).

Exemplary Computer System and Apparatus

Figure 6:
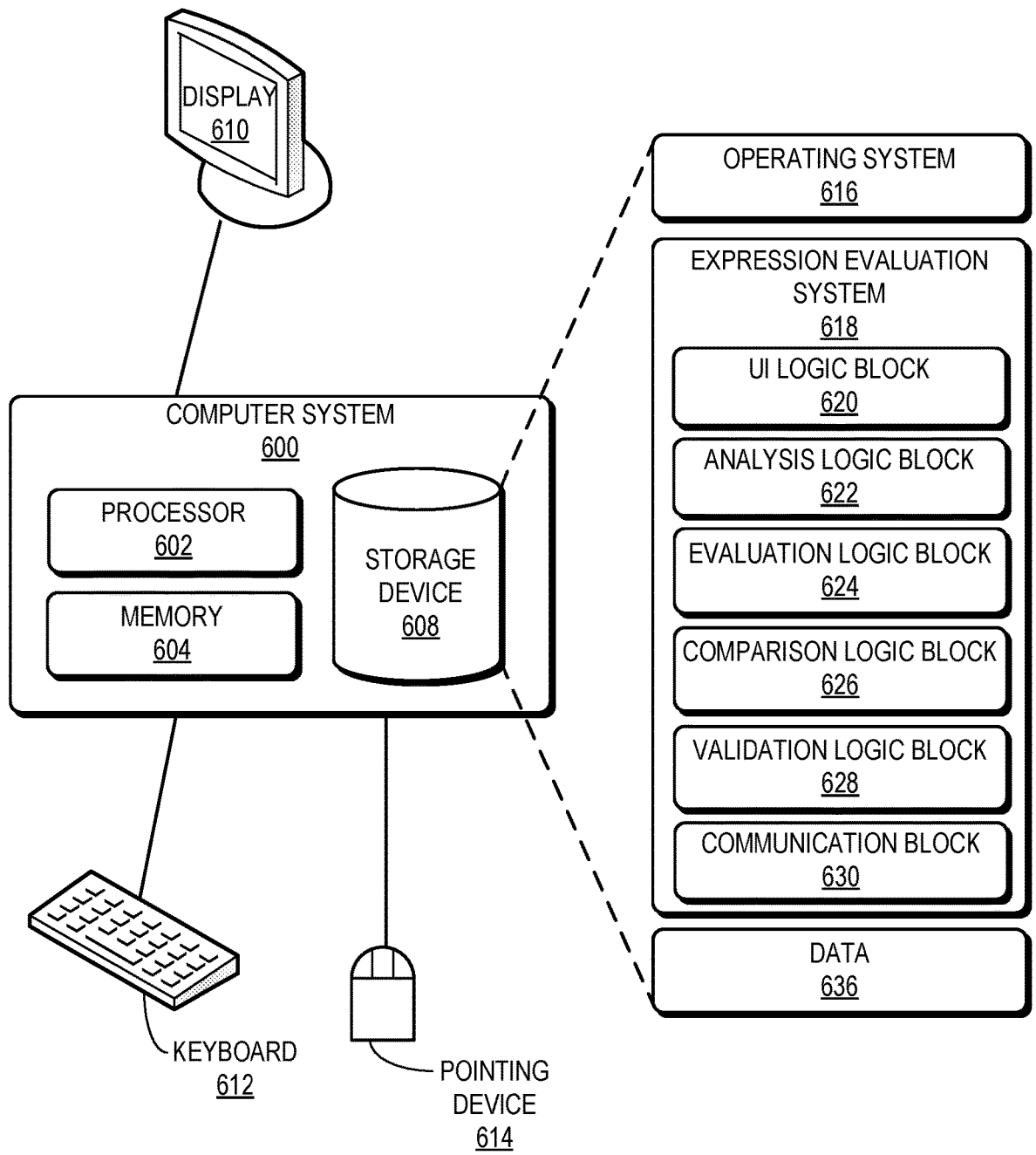
FIG. 6 illustrates an exemplary computer system that facilitates an expression evaluation system, in accordance with an embodiment of the present application.

FIG. 6 illustrates an exemplary computer system that facilitates an expression evaluation system, in accordance with an embodiment of the present application. Computer and communication system 600 includes a processor 602, a memory device 604, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616, an expression evaluation system 618, and data 636. Expression evaluation system 618 can facilitate the operations of system 110.

Expression evaluation system 618 can include instructions, which when executed by computer and communication system 600 can cause computer and communication system 600 to perform methods and/or processes described in this disclosure. Specifically, expression evaluation system 618 can include instructions for presenting a user interface that can obtain an encoded expression from an administrator and can facilitate validation of an encoded expression (user interface (UI) logic block 620). Expression evaluation system 618 can also include instructions for analyzing an encoded expression for validation (analysis logic block 622). Moreover, expression evaluation system 618 can also include instructions for identifying an outlier in a user group and determining whether an encoded expression conforms to a policy (analysis logic block 622).

Furthermore, expression evaluation system 618 can include instructions for evaluating an encoded expression based on a switch grammar (evaluation logic block 624). Expression evaluation system 618 can also include instructions for comparing commands associated an encoded expression across switch types and with historical commands (comparison logic block 626). Expression evaluation system 618 can include instructions for validating an encoded expression via a UI (validation logic block 628).

Expression evaluation system 618 may further include instructions for sending and receiving messages (communication logic block 630). Data 636 can include any data that can facilitate the operations of expression evaluation system 618. Data 636 can include, but are not limited to, a respective switch grammar of a network, user group information, time-series information indicating commands executed by a respective user, and a respective encoded expression defined for a respective user group.

Figure 7:
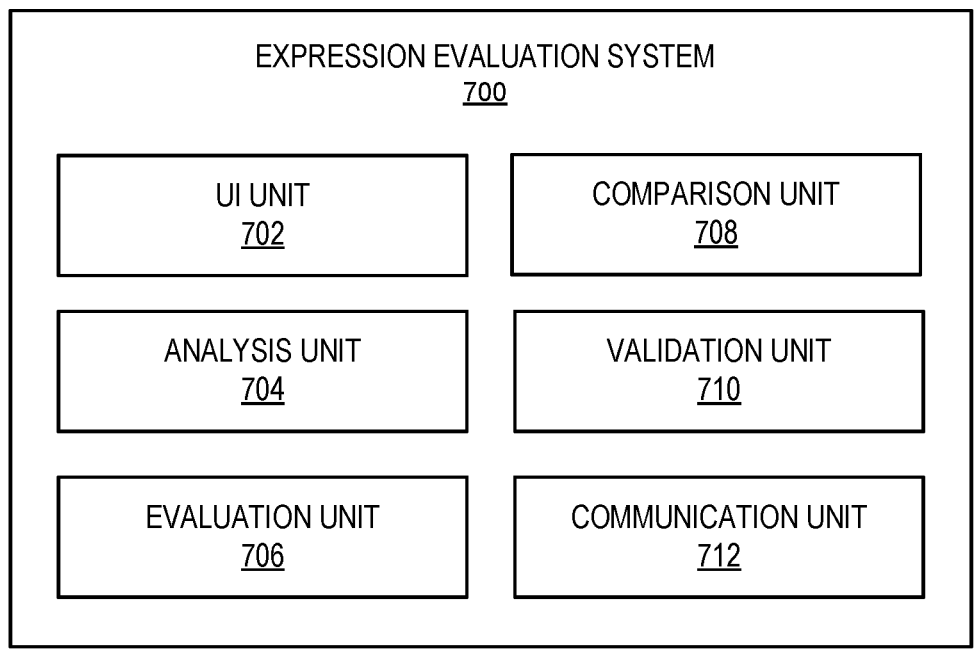
FIG. 7 illustrates an exemplary apparatus that facilitates an expression evaluation system, in accordance with an embodiment of the present application.

FIG. 7 illustrates an exemplary apparatus that facilitates an expression evaluation system, in accordance with an embodiment of the present application. Dataset management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-712, which perform functions or operations similar to modules 620-630 of computer and communication system 600 of FIG. 6, including: a UI unit 702; an analysis unit 704; an evaluation unit 706; a comparison unit 708; a validation unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating an enhanced permission management system, comprising:
    obtaining an encoded expression associated with a user group of a network, wherein the encoded expression represents a set of encoded commands;
    evaluating the encoded expression for a first switch in the network to determine a first set of commands that the user group is allowed to execute on the first switch;
    determining validity of the first set of commands for the user group by determining whether a respective user of the user group should be allowed to execute the first set of commands on the first switch;
    in response to identifying an issue with the validity of the first set commands, generating a notification indicating the issue;
    obtaining a second set of commands previously issued from the user group on the first switch; and
    comparing the first and second sets of commands to determine presence of inconsistency, wherein the inconsistency indicates one or more of:
        whether a previously issued command from the user group is absent in the first set of commands; and
        whether a command that has not been issued from the user group is included in the first set of commands.

2. The method of claim 1, further comprising:
    evaluating the encoded expression for a second switch in the network to determine a second set of commands that the user group is allowed to execute on the second switch; and
    comparing the first and second sets of commands to determine presence of inconsistency.

3. The method of claim 1, wherein evaluating the encoded expression comprises:
    obtaining switch grammar associated with the first switch, wherein the switch grammar includes a structured representation of commands supported by the first switch; and
    determining the first set of commands by identifying commands that correspond to the encoded expression in the switch grammar.

4. The method of claim 1, further comprising:
    presenting a user interface depicting a set of commands supported by the first switch; and
    receiving a selection that selects the first set of commands from the set of commands.

5. The method of claim 4, wherein the set of commands are categorized into a set of command groups; and
    wherein the method further comprises:
        generating a sub-expression for a respective command group that has been selected; and
        combining one or more generated sub-expressions to generate the encoded expression.

6. The method of claim 1, wherein determining the validity of the first set of commands further comprises:
    presenting the first set of commands to via a user interface; and
    allowing user feedback to be received regarding the validity of the encoded expression.

7. The method of claim 1, further comprising determining, for the first set of commands, an outlier in the user group based on commands issued by a respective user of the user group.

8. The method of claim 1, further comprising determining whether the first set of commands conforms to a policy indicating whether the user group can be allowed to execute the first set of commands on the first switch.

9. A non-transitory computer-readable storage medium storing instructions that when executed by a computer cause the computer to perform a method for facilitating an expression evaluation system, the method comprising:
    obtaining an encoded expression associated with a user group of a network, wherein the encoded expression represents a set of encoded commands;
    evaluating the encoded expression for a first switch to determine a first set of commands that the user group is allowed to execute on the first switch;
    determining validity of the first set of commands for the user group by determining whether a respective user of the user group should be allowed to execute the first set of commands on the first switch;
    in response to identifying an issue with the validity of the first set commands, generating a notification indicating the issue;
    obtaining a second set of commands previously issued from the user group on the first switch; and
    comparing the first and second sets of commands to determine presence of inconsistency, wherein the inconsistency indicates one or more of:
        whether a previously issued command from the user group is absent in the first set of commands; and whether a command that has not been issued from the user group is included in the first set of commands.

10. The computer-readable storage medium of claim 9, wherein the method further comprises:
evaluating the encoded expression for a second switch in the network to determine a second set of commands that the user group is allowed to execute on the second switch; and
comparing the first and second sets of commands to determine presence of inconsistency.

11. The computer-readable storage medium of claim 9, wherein evaluating the encoded expression comprises:
obtaining switch grammar associated with the first switch, wherein the switch grammar includes a structured representation of commands supported by the first switch; and
determining the first set of commands by identifying commands that correspond to the encoded expression in the switch grammar.

12. The computer-readable storage medium of claim 9, wherein the method further comprises:
presenting a user interface depicting a set of commands supported by the first switch; and
receiving a selection that selects the first set of commands from the set of commands.

13. The computer-readable storage medium of claim 12, wherein the set of commands are categorized into a set of command groups; and
wherein the method further comprises:
generating a sub-expression for a respective command group that has been selected; and
combining one or more generated sub-expressions to generate the encoded expression.

14. The computer-readable storage medium of claim 9, wherein determining the validity of the first set of commands further comprises:
presenting the first set of commands to via a user interface; and
allowing user feedback to be received regarding the validity of the encoded expression.

15. The computer-readable storage medium of claim 9, wherein the method further comprises determining, for the first set of commands, an outlier in the user group based on commands issued by a respective user of the user group.

16. The computer-readable storage medium of claim 9, wherein the method further comprises determining whether the first set of commands conforms to a policy indicating whether the user group can be allowed to execute the first set of commands on the first switch.

* * * * *